UNITED STATES PATENT OFFICE.

WALTER WILLIAM CRAWFORD, OF KEW GARDENS, SURREY, ENGLAND.

MANUFACTURE OF BRICKS.

1,395,990.    Specification of Letters Patent.    Patented Nov. 1, 1921.

No Drawing.    Application filed January 5, 1921. Serial No. 435,241.

*To all whom it may concern:*

Be it known that I, WALTER WILLIAM CRAWFORD, a subject of the King of Great Britain and Ireland, residing at Cumberland House, Kew Gardens, Surrey, England, have invented certain new and useful Improvements in and Relating to the Manufacture of Bricks, (for which I have filed application in Great Britain on December 1, 1919, under No. 20139/19,) of which the following is a specification.

This invention relates to the manufacture of bricks and the like, and its object is to provide an improved process for the manufacture of these articles from almost any kind of earth or clay which may be available in the particular locality, the products obtained moreover, being of great strength and durability.

At the present time there is a great shortage of bricks and the like, and building operations are being seriously interfered with thereby, as well as by the high cost of the ordinary burnt red bricks. The present invention seeks to overcome these difficulties, by providing means whereby bricks of excellent quality can rapidly and economically be manufactured in practically any locality. According to the invention, any kind of clay or earth, even ordinary soil, can be used for brick making, and I have found that if the directions given herein are carefully followed, bricks of great strength and durability will be obtained at a cost much below that of the ordinary burnt brick.

Various processes have in the past been proposed for making bricks and the like, from either clay burnt or unburnt, or from other siliceous material, by mixing cement therewith, and adding water, after which the mixture has been pressed into molds and the molded articles allowed to set.

I have found however, that in order to obtain satisfactory results from a brick of this kind, it is necessary to manufacture the same with great care, and as a result of a large number of experiments, I have found that by closely following the directions given below, bricks and the like can be produced of a strength and durability not hitherto attained in this class of material.

The invention has the further advantage already referred to, of enabling these results to be obtained, not only with the ordinary materials hitherto employed, such as slag, brick dust, sand and the like, but with any kind of earth or soil which may be available.

The process which is the subject of the present invention, consists in taking any kind of earth and/or soil, and/or clay, burning the same in an oxidizing atmosphere at a temperature of about 1500° C., and then mixing it with a relatively small quantity of previously dehydrated Portland or like cement, moistening the mixture, pressing it into molds, immersing the molded bricks in cold water for several hours, and air-drying them at a temperature only slightly above freezing point.

The invention further comprises the use of only just sufficient warm water for moistening the burnt gangue and cement, to cause it to ball or stick together when squeezed by the hand, as well as the step of compressing the mixture into molds under a pressure of not less than 150 lbs. to the square inch.

The invention is carried out as follows:

Any kind of clay, or ordinary earth or soil, may be used as the raw material. Ordinary earth usually consists of a mixture of uncombined alumina and silica, together with humus, and generally also a certain amount of oxid of iron. If desired, a mixture of these materials may be used, and the material used will hereafter be referred to as gangue. The gangue is first burnt by being submitted for a short period, 15 minutes will generally suffice, to a temperature of 1500° C., in an oxidizing atmosphere. Any convenient furnace may be employed for this purpose, but I have found that the oil burner described in my Letters Patent of Great Britain No. 2860/15, is particularly suitable for obtaining the required temperature. A convenient method of burning the gangue in this type of furnace consists in feeding it on to a traveling band of suitable refractory material, and causing the latter to travel at the proper speed through the furnace. The burning operation has the effect of removing all organic or volatile matter, and I have found that whatever the gangue used may be, it is important that it should first be burnt.

After the gangue has been burnt, it is mixed with Portland or like cement, which has previously been dehydrated, at a temperature not exceeding 132° C. This step is also an important one, and I have found that if the cement has not been dehydrated before use, the quality of the resulting brick will suffer.

The burnt gangue is mixed with the dehydrated Portland cement, in any suitable type of rotary mixer, the amount of cement used, being not less than 1 part in 8 parts of the mixture. If bricks of any particular color are required, a powdered metallic oxid, or other suitable pigment to produce that color is added to the mixture at this stage. Thus for example, if a red brick is required, oxid of iron should be added to the mixture, unless the gangue already contains enough of this substance.

When the ingredients have been thoroughly mixed and while they are still being kept in motion by the rotary mixer, water, preferably at a temperature of about 65° C., is sprayed on to the mixture. Great care should be taken not to add too much water to the mixture, the correct amount being just enough to moisten it sufficiently to cause it to ball or stick together when squeezed in the hand.

The mass is then immediately removed from the mixer, and quickly pressed into molds, in any convenient form of press. The pressure used should in no case be less than 150 lbs. to the square inch, although very much higher pressures, e. g. as high as 100 tons to the square foot, have been used with advantage.

The bricks are then removed from the molds and if not sufficiently hardened, they are permited to harden or set, and are then immersed in cold water for several hours, and until all air bubbles have disappeared. They are then air-dried for several days in a cold room, the temperature of which is only very slightly, e. g. 1° C. above freezing point. Care should however be taken to see that the temperature is always slightly higher than freezing point. I have found that the low temperature during aeration causes a considerable increase in the strength of the brick, and I attribute this effect to the fact that it retards the setting of the cement, and consequently produces longer crystals during such setting.

By proceeding in the manner described, I have obtained bricks of excellent texture, and appearance, and very great strength, the crushing strain required to break them after 30 days aeration, being as high as 106 tons per square inch.

Bricks of the high quality referred to, can be manufactured rapidly, and at a very much smaller cost, than that of the ordinary burnt brick, and a further great advantage of the process is that it can be carried out anywhere where ordinary soil or earth is obtainable.

I claim:—

1. The method of manufacturing bricks and the like, which comprises burning a suitable gangue in an oxidizing atmosphere, then mixing the burned material with a relatively small quantity of dehydrated cement, then moistening the mixture and pressing the same into form, then immersing said pressed form in cold water, and finally drying the pressed bricks at a low temperature.

2. The method of manufacturing bricks and the like, which comprises burning a suitable gangue in an oxidizing atmosphere at a temperature of approximately 1500° C., then mixing the burned material with a relatively small quantity of dehydrated cement, then moistening the burned mixture enough to cause the same to ball or stick together, then pressing the mixture into form, then immersing said form in cold water until the air bubbles are removed, and finally air drying the pressed bricks at a low temperature.

3. The method of manufacturing bricks and the like, which consists in burning a suitable gangue in an oxidizing atmosphere at a temperature of approximately 1500° C., then mixing the burned material with a relatively small quantity of dehydrated cement, then moistening the burned mixture enough to cause the same to ball or stick together, then pressing the mixture into form under a pressure of 150 pounds to the square inch, then immersing the pressed bricks in cold water for several hours, and finally air drying said bricks at a temperature only slightly above freezing point.

In witness whereof I affix my signature.

WALTER WILLIAM CRAWFORD.

Witnesses:
   FRANK B. DEHN,
   G. P. YOUNG.